United States Patent Office 3,333,972
Patented Aug. 1, 1967

3,333,972
REFRACTORY PRODUCTS AND METHOD
Jack T. Elmer, Contra Costa County, and Berton G. Altmann, Santa Clara, Calif., assignors to Kaiser Aluminum & Chemical Corporation, Oakland, Calif., a corporation of Delaware
No Drawing. Filed Jan. 7, 1963, Ser. No. 249,598
27 Claims. (Cl. 106—58)

This application is a continuation-in-part of application Ser. No. 167,419, filed Jan. 19, 1962, which in turn was a continuation-in-part of application Ser. No. 563,813, filed Feb. 6, 1956, both of which are now abandoned.

This invention relates to the preparation of refractory structures and to a cementitious magnesia composition suitable for making the same. These structures and composition are particularly useful in the construction of containers or devices or furnaces for the melting of metals such as iron, steel and copper.

In the preparation of refractory structures the ability to prepare complex shapes or large masses, for instance by casting refractory concretes into easily prepared forms has been long desired and certain refractory structures have heretofore been made from refractory concretes. However, the cements available to the art have in many instances not provided sufficient refractoriness or resistance to metallic oxides and basic slags to allow such concretes to be used as or in hearths and associated furnace structures employed in the smelting of iron, steel, copper and the like.

The magnesian cements heretofore available have been, in addition to the above disadvantage, either lacking in volume stability and resistance to swelling, shrinking or cracking during drying, firing or upon standing between firing periods; or have lacked strength at cold, intermediate or high temperatures; or have had other disadvantages. Also, bricks comprising magnesia, magnesia spinels or magnesia-chromite mixture have not had sufficient off-the-press strength, i.e. strength as taken directly from the pressing mold or die, and have required careful handling to avoid excessive breakage or damage.

The well-known Sorel cements have been useful in casting articles, made of plastic or active magnesia, to be used in the cold, i.e., for non-refractory uses, but it has been known that, when heated to more than about 90° C. such articles swell excessively and at or above about 1800° F. or 1000° C., such cements are subject to excessive shrinkage either or both of which characteristics can lead to destructive cracking in a concrete structure bonded with such cement. In general, results obtained in making refractory shapes or structures by cold casting compositions comprising refractory aggregates and magnesia cements have been erratic and unpredictable or have been very expensive or have required the use of agents dangerous to the health of workers.

According to the present invention, there is provided a volume stable magnesia refractory cementitious material which comprises an intimate admixture of finely divided nonplastic magnesia and a small amount, up to 15% by weight, of an aliphatic, hydroxy, tricarboxylic acid, such as citric acid, or of a salt or ester of such acid, or of any desired mixture of such compounds. Preferably, there is employed from 0.01% to 15% of such addition agent. To gain the greatest advantages of this invention, the magnesia and citric or other acid are in uniform, intimate admixture. The acid or salt employed is preferably water-soluble or soluble in the tempering liquid used. By this invention there is also provided a concrete composition containing aggregate in admixture with the cementitious composition described. Bricks or other shapes or structure can also be prepared from mixtures of refractory aggregate and the cementitious composition, employing pressures in forming the same into shapes.

The aliphatic, hydroxy, tricarboxylic acid material useful in this invention is, for example, citric acid, agaracinic acid $$n\text{-}C_{15}H_{31}CH_2(COOH)C(OH)(COOH)CH_2COOH$$

caperatic acid $$n\text{-}C_{14}H_{29}CH(COOH)C(OH)(COOH)CH_2COOH$$

or agaric or laricic acid $$(HOOC)CH_2C(OH)(COOH)CH(COOH)C_{16}H_{33}$$

or an inorganic or organic salt or ester of such acid. Preferably there is employed citric acid or a salt or ester thereof. Mixtures of the materials are employed, if desired. There is incorporated in the cementitious composition a small amount, up to 15% citric acid or its salt or ester; and preferably there is employed from 0.1% to 6% based on the weight of the cement, for greatest ease of handling the composition of this invention. Excellent results are obtained by so employing from 0.5% to 1.0% citric acid. More than 15% can be used, if desired, but the cement then sets more rapidly and in practice therefore up to about 15% is employed. Citric acid is obtained from a number of sources, but usually as an extract of the juice of lemons, and it is also known as 2-propanol-1,2,3-tricarboxylic acid, of the formula $$(HOOCCH_2)_2C(OH)(COOH)$$

The acid or other compound described, where premixed in the dry unset cement composition, is preferably employed in finely divided form. One type of compound found to be very useful in this invention is an inorganic salt of citric acid, such as the citrate of an alkali metal such as sodium or potassium, or an alkaline earth metal such as calcium, barium or strontium, or ammonium, magnesium, silver or cobalt or the like. Especially good results are obtained by the use of citric acid, ammonium citrate or magnesium citrate. The invention will be more specifically described with respect to citric acid and its metal salts, but the other compounds mentioned are alternatively employed.

The magnesia employed in the cement composition is nonplastic and finely divided. Suitably, it is employed in a particle size substantialy all passing through a screen having 40 meshes to the linear inch, and preferably passes through a 100 mesh screen. The magnesia exhibits very little residual shrinkage upon further firing. The magnesia employed herein includes, for example, periclase, dead-burned magnesite, magnesite grain of the type known to the art as Austrian magnesite (e.g., containing from 3% to 5% CaO, about 2% $SiO_2$ and up to 7% or 8% of ferric oxide), or magnesia spinel material containing excess or uncombined MgO. Hardburned or intermediate burned magnesia is also useful. For products of highest refractoriness, there is employed high purity magnesia, such as periclase containing not over 2% lime, CaO, and not over 2% silica, $SiO_2$, and containing at least 95.0% magnesium oxide. The magnesia is obtained by calcining natural ores, such as magnesite or brucite; or it is obtained by calcining a magnesium compound which yields magnesium oxide upon calcination, for example, magnesium hydroxide, magnesium carbonate or basic carbonate, magnesium acetate or magnesium alcoholate; or it is obtained by oxidizing magnesium metal. In one mode of operation, a suitable magnesia is obtained by reacting a water solution of a magnesium salt, such as inland brine, sea water, bitterns or the like, with an alkali such as lime, calcined dolomite, caustic soda, caustic potash or other alkali, to precipitate magnesium hydroxide, and recovering the precipitated magnesium hydroxide, washing and calcining or firing to obtain magnesia or periclase. Magnesium carbonate obtained by the precipitation methods well known in this art can also be calcined to form magnesia suitable for use in this invention. The magnesia useful herein can be produced by firing a suitable magnesium compound in a rotary or stack kiln, or by electrical fusion. The deadburned magnesities useful in this invention generally contain from about 82% to 92% MgO, although some varieties contain even less MgO. Mixtures of the magnesia components can be employed. The nonplastic magnesia can be a mixture of higher burned magnesia and a minor amount of active magnesia, but should have an overall bulk density of at least 60 lbs. per cu. ft. Preferably, the magnesia is higher burned and of at least the bulk density stated.

The cementitious composition according to this invention is especially useful for refractory purposes by itself, for instance, in use as a mortar. It is also especially useful as the cement or bonding agent employed in admixture with sized aggregate in making formed shapes, for instance, bricks or tiles, or for refractory concretes which can be cast or otherwise shaped. The nonacid, i.e., basic or neutral, aggregates or grains useful in admixture with the cement according to this invention include periclase, deadburned magnesite, chromite or chrome, alumina, spinels such as magnesio-chromite, magnesium aluminate, magnesium ferrite, chrome-iron oxide, also olivine, forsteritic periclase, carbon, iron ore, deadburned dolomite, salvaged chromite or salvaged magnesite brick or mixtures of these materials. One suitable type of mixed aggregate, for example, consists essentially of from 20 to 80 parts of periclase grain and from 80 to 20 parts of chromite. Acid aggregates are also useful with the cementitious composition of this invention, for instance, in making insulating refractories, or units which are combinations of insulating and refractory portions. There are employed acid aggregates such as silica, clay, diatomaceous earth, mica, expanded vermiculite or the like. In general, the acid aggregates are used at more moderate temperatures, that is, below the fusion points of the products of reaction between such aggregates and the magnesia of the cement.

When the cementitious composition is employed in admixture with refractory aggregate in the production of pressed shapes or products to be rammed, for instance brick, tile or raming mix, it preferably constitutes from about 10% to about 60% of the total mix. When used as a mortar, the cement is used alone or with aggregate of small grain sizes. When employed in refractory concretes, from about 10% to about 60%, preferably about 30%, of the concrete is the cementitious composition of this invention; that is, the amount incorporated is that which imparts workability to the mix. These amounts are based on the total dry weight of the ingredients of the unfired mix. The amount of water employed in forming or in casting the mix is that which is sufficient to temper or to impart plasticity thereto, according to good practice as well known in this art. In general, in making cast concretes using a coarse aggregate there is employed from 4% to 15% water; in making castings employing finer grained aggregate, for instance in slip casting, much higher amounts of water, e.g. 35% to 40% or more, are employed; and in making pressed shapes, such as brick, or in ramming mixes or spray mixes there is employed from 1% to 7% or more of water. The percent of water is calculated on the dry solids.

When making up batches, the grain sizing of the aggregate is, if desired, selected in order to provide dense packing, in the known manner. Alternatively, random grain sizes are employed in various batches, especially in making objects containing larger amounts of the cement. Very large grain sizes up to 3 inches or more in diameter, can be included in concretes, for example, because the cementitious or bonding composition remains constant in volume during curing or the formation of the cold, or chemical, bond and also upon firing, and therefore the disadvantageous shrinking, swelling or cracking of prior art compositions is avoided.

In making up concretes, mortars, shaped objects or other products according to the present invention, the finely divided magnesia and the acid defined are intimately and uniformly admixed, and are mixed with water, and if desired, with aggregate of the kind and amount descried and the whole is then cast, or pressed into shape. The magnesia and acid can be mixed together in dry form or the acid can be first dissolved in water or other desired tempering liquid and then admixed with the magnesia. Where a batch is made up including magnesia aggregate, the finely divided portion of the aggregate, especially that passing 40 mesh, or preferably 100 mesh, is useful as the magnesia component of the bond. The mixes are formed into the final product by casting, pressing, ramming, vibrating, spraying, gunning or other desired means. In another mode of procedure, a semi-plastic mass of these materials is formed, for instance, in a pug mill and shaped thereby into rough blanks which are then given their final form in a re-press operation, similar to the precedure heretofore practiced preferentially with clay materials.

It is an advantage of the present invention that there are obtained magnesia-containing refractory structures which are resistant to dimensional change. It is a further advantage that pressed objects made according to this invention exhibit increased crushing strength and bulk density or unit weight as compared with objects made in the same manner except that citric acid is not incorporated. In the production of pressed objects, excellent off-press strengths are obtained, so that the satisfactory removal of the object from the press is facilitated. The set cement does not exhibit deleterious cracking or shrinkage either in the cold or upon heating and/or firing. Refractory concretes prepared according to the invention are very advantageous in a variety of applications. They can be employed as working surfaces in locations where they are directly exposed to or in contact with hot furnace gases or molten metal or other hot contents. They can be employed, for instance, in casting in place furnace bottoms, such as for open hearth or electric steel furnaces, soaking pits, converters or other high temperature furnace bottoms. The concrete can also be employed to cast other parts of a furnace structure, such as walls, roofs or door linings. The bottoms or other structures can be precast in sections and can be cured, dried and installed; or, if desired, can be fired and then installed. After installation it may be desirable to cast bonding amounts of the concrete or cement between these sections to provide a monolithic hearth or a more continuous structure. Units of any desired shape or size can be made according to this invention. The shapes can be formed so as to interlock when installed in the place of use. Composite shapes, i.e. comprising more than one type of refractory concrete as distinguished by different aggregates, can be made. For example, a portion can be made of the cementitious composition of the invention and an insulating aggregate; and another portion of the cement and a dense refractory aggregate, the two portions being suitably cast in contact with each other. Reinforcing elements or supporting or hanger elements or devices, which can be of metal or of refractory material, can be cast integrally with the cast shape or body. The refractory concrete can be cast into or integrally with metal containers or plates which can cover or be applied to one or more sides or faces of the cast mass. The metal container or plate can be provided with lugs or ears, or holes or apertures, to ensure bonding, if desired. Instead of a metal container or plate, there can be employed a combustible container or plate which will burn out upon firing. The refractory concrete is suitable for casting about a pipe or conduit to provide a unitary structure which can be employed, for instance, as a tuyere block or burner block. The concrete can also be used to repair or re-surface furnace bottoms or structures. Such placement can conveniently be effected by means of a concrete gun.

The following tests demonstrate the effectiveness of even a very small addition of citric acid or an inorganic salt thereof, for example, in increasing resistance to volume change in a magnesia refractory material. An amount of periclase made according to Austin et al., U.S. 2,487,290, and having the following typical analysis: 2.2% $SiO_2$, 1.3% CaO, 0.5% $Fe_2O_3$ and 0.4% $Al_2O_3$, 0.25% $Cr_2O_3$, and (by difference) 95.35% MgO, is crushed and ground to 68.6% passing 6 and retained on 14 mesh, and 31.4% passing 14 and retained on 65 mesh. This material is divided into two batches, A and B. Each batch is then divided again into four portions, a, b, c and d, and with each portion is admixed as bonding agent, 30% of finely divided periclase of the same sort but having particles of the following specific surfaces, determined by the Blaine method:

| Portion: | Specific surface of periclase bonding agent sq. cm./gm. |
|---|---|
| a | 2200 |
| b | 3400 |
| c | 5000 |
| d | 6400 |

There is added to each portion of A about 6% of water, or sufficient water to make a plastic, castable mass; and to each portion of B the same amount of water, but containing dissolved therein 0.25% citric acid based on the total dry solids. Each portion is thoroughly blended and cast into bars which are then placed in an oven at 99° C., the atmosphere of which is saturated with moisture, and are maintained under these conditions for 20 hrs. At the end of this time, the percentage linear change is measured, and is found to be as follows:

TABLE I

| Portion | Percent linear change | |
|---|---|---|
| | A<br>No citric acid | B<br>0.25% citric acid |
| a | +2.6 | −0.05 |
| b | +4.9 | +0.03 |
| c | +6.9 | +0.05 |
| d | +8.2 | +0.12 |

It is seen that the volume stability or resistance to dimensional change is excellent where the citric acid is added, whereas swelling is excessive without this addition, and the control of swelling by use of citric acid is effective with varying specific surfaces or particle sizes.

The following tests show the effects of varying amounts of citric acid in controlling the expansion of magnesia refractories. A batch of aggregate is prepared consisting of periclase made as described in Austin et al., U.S. 2,487,290 and of the following particle sizes:

| | Percent |
|---|---|
| Passing 6 mesh and retained on 8 mesh | 38 |
| Passing 8 mesh and retained on 14 mesh | 10 |
| Passing 10 mesh and retained on 20 mesh | 10 |
| Passing 14 mesh and retained on 28 mesh | 10 |
| Passing 35 mesh and retained on 65 mesh | 2 |
| Ball milled to pass 10 mesh, and having a specific surface of 2400 sq. cm./gm. | 30 |

This periclase material is mixed dry and divided into several portions. The soluble additive shown in Table II below is dissolved in about 6% tempering water and then mixed gradually into each portion of the above periclase batch in the percentage shown in the table. The thoroughly mixed portion is cast into a 5 x 5 x 22 cm. rectangular receptacle, in each instance. One set of these test pieces is allowed to cure in air for 20 hrs., then dried at 120° C. for 24 hrs. and is then tested for modulus of rupture, the results being set forth in Table II. The other set of test pieces are enclosed in a polyethylene bag, then covered with aluminum foil, placed in an oven at 95° C. for the times shown; and expansion is measured on these pieces by a recording dilatometer. These pieces, after the expansion test is completed, are then dried at 120° C. for 24 hrs. and then tested for modulus of rupture.

TABLE II

| Portion | Percent citric acid | Percent Linear Expansion after— | | Modulus of Rupture, p.s.i. | |
|---|---|---|---|---|---|
| | | 14.5 hrs. | 20 hrs. | Expanded Sample (after 20 hrs.) | Air Cured |
| 1 | 0.00 | 2.4 | 4.1 | Crumbled | 91 |
| 2 | 0.05 | 0.4 | 1.3 | 39 | 271 |
| 3 | 0.10 | 0.1 | 0.4 | 98 | 329 |
| 4 | 0.25 | 0.02 | 0.02 | 1,500 | 360 |

A further amount of the above periclase material is divided into two portions, 5 and 6. With Test 5 is admixed 8.75% water in which is dissolved 0.5% citric acid and there is also dispersed therein 1% hydrated sodium silicate. With Test 6 there is admixed 7.5% water containing dispersed therein 1% hydrated sodium silicate and no citric acid. The mixes are cast and one set of pieces so obtained of each portion is treated to determine expansion characteristics, all as described above for Table II. A portion of each set treated for expansion characteristics is, at the end of that test, dried and tested for modulus of rupture. The results are set forth in Table III below.

TABLE III

| Test No. | Percent Linear Expansion after— | | Modulus of Rupture, p.s.i. |
|---|---|---|---|
| | 14.5 hrs. | 20 hrs. | |
| 5 | 0.0 | 0.14 | 330 |
| 6 | 1.6 | 3.8 | Crumbled |

In a still further series of tests, batches are made up as in the manner described in connection with Tables II and III, except that in this series three is employed as magnesia in making up tests 7 and 8 a magnesia spinel refractory material containing 50% periclase crystals, and in tests 9 and 10 a magnesia spinel refractory containing 75% periclase crystals; and in both of these refractories the remaining constituent, that is, the spinel component consists essentially of 33% magnesioferrite and 67% magnesium aluminate. Table IV shows the results obtained with these compositions, about 6% water being used to give casting plasticity to the portions. Testing is carried out in the same manner as for Tables II and III above except that expansion is determined after 14.5 hours.

TABLE IV

| Portion | Citric Acid, Percent | Percent Linear Expansion After 14.5 hrs. | Modulus of Rupture After Test, p.s.i. |
|---|---|---|---|
| 7 | 0.0 | 4.8 | Crumbled |
| 8 | 0.25 | 0.05 | 273 |
| 9 | 0.00 | 5.4 | Crumbled |
| 10 | 0.25 | 0.15 | 240 |

The above tests show the excellent control of expansion under these severe testing conditions, and also the increase in strength which is obtained. In addition, it has been found that the expansion of magnesia-containing cements has been so controlled that it does not exceed about 0.5%, by the addition of salts of citric acid, for example, the citrate of potassium, ammoium, calcium, silver, magnesium, sodium, barium and others. By the addition, for example, of 0.75% of such salt in a cementitious composition according to this invention, linear expansion has been reduced from around 8% to less than 0.5%, or in some instances to less than 0.1%.

The following examples will describe more clearly some embodiments of refractory compositions of this invention and of methods of making such compositions.

Example 1

Periclase brick are made as follows:

Periclase refractory material, made from magnesia which has been prepared by reacting sea water with calcined dolomite and according to the process described in L. W. Austin, U.S. 2,537,014, is crushed and ground to the following particle sizes: 46.3% passing 4 mesh and retained on 12 mesh, 14.6% passing 20 mesh and retained on 40 mesh, 8.4% passing 40 mesh and retained on 100 mesh and 30.7% passing 100 mesh. The periclase has the following typical analysis: 5.5% $SiO_2$, 1.3% CaO, 0.4% $Fe_2O_3$, 0.3% $Al_2O_3$, and 92.5% MgO (by difference). To 93.46 parts by weight of this periclase grain there are added 4.43 parts of volatilized silica, 1.77 parts magnesium sulfate and 0.34 part citric acid. There are admixed 5 parts of water per 100 parts of this mixture, or 5% based on total dry solids, to temper the batch. In making up the batch, the citric acid is first dissolved in the tempering water and the solution is then thoroughly admixed with the solids remaining to form a plastic mass which can be poured and it is then cast into brick mold forms and allowed to harden and dry and the bricks so formed are removed from the molds. The brick exhibit very little, or substantially no, swelling or shrinking and have good strengths. They are fired at about 1400° C., exhibiting no deleterious cracking or shrinking and having excellent hot strengths.

Example 2

Another set of cast bricks are prepared as follows: Chromite ore (Philippine ore), having the following typical analysis: 30% $Cr_2O_3$, 27.5% $Al_2O_3$, 13% $Fe_2O_3$, 4.7% $SiO_2$, 0.9% CaO and (by difference) 23.9% MgO, is crushed and ground to 76.8% passing 4 mesh and retained on 14 mesh and 23.2% passing 14 mesh and retained on 40 mesh. An amount of periclase made according to Austin et al., U.S. 2,487,290, is crushed and ground to particle size 14% passing 20 and retained on 40 mesh and 86% passing 100 mesh. These are admixed in the ratio of 65.47 parts of the chromite material and 30.5 parts of the periclase material, and 0.73 part $CrO_3$, and this admixture is divided into two portions. With portion 2a there are admixed 2.9 parts water containing 0.5 part citric acid; and with portion 2b there are admixed 3.4 parts water and no citric acid. After thorough blending, the batches are pressed into shapes in a vibrating press under a low pressure, about 25 lbs. per sq. in., and are allowed to harden for approximately 2 hrs., after which they are removed from the molds, then dried to about 400° F. and finally fired in a tunnel kiln at about 1350° C. for approximately 4 hrs. The portion containing citric acid exhibits better plasticity and remains workable for a longer time, even with less water; and upon firing the pieces so produced exhibit substantially no cracking, and had increased strengths as compared with the pieces made without citric acid. Without the incorporation of the addition agent described herein it is difficult to fire under these circumstances without resultant cracking.

Example 3

Another batch is made up similarly to that shown in Example 2, except that there is admixed 28.24 parts of the chromite of the sizes shown therein and 65.88 parts of the same kind of periclase except that the grain sizing is proportioned as follows: 28.24 parts passing 6 and retained on 12 mesh, 4.77 parts passing 40 and retained on 100 mesh and 32.87 parts passing 100 mesh. In this example there are admixed 3.60 parts of volatilized silica, 1.6 parts magnesium sulfate and 0.5% citric acid. There is then added 6% of water, and the whole is blended in a concrete mixer; and is then cast into a form to make a segment of a side wall lining for an electric furnace. Casting is done by vibration from a concrete vibrator of the kind well known to the art. The resulting piece is about 6 feet high, 13½ inches deep and tapers from 18½ to 16⅜ inches in width, and it weighs approximately 1700 lbs. The piece is allowed to harden for about 2 weeks and is then removed from the mold form and dried by heating up to about 500° F. in about 8 hours. The dried piece is installed in a test section in the side wall of a furnace lining, the remainder of this section being pressed brick of the same composition except that no citric acid was employed in making the brick. The cast section is then fired in place and exhibits no deleterious cracking or shrinking and shows good service in place. This is an unexpected advantage because it would be expected that substantial stresses and strains would be set up in such a large section or piece.

Example 4

An amount of periclase of the chemical analysis shown in Example 1 is crushed and ground and is admixed with volatilized silica and magnesium sulfate in the following proportions:

| Periclase: | Percent |
|---|---|
| Passing 4 mesh, retained on 14 mesh | 20.1 |
| Passing 14 mesh, retained on 100 mesh | 19.6 |
| Passing 100 mesh | 55.2 |
| Volatilized silica | 3.5 |
| Magnesium sulfate | 1.6 |

This mixture is then divided into two portions and portion 4a is tempered with 3.7% water; and portion 4b with 2.7% water containing dissolved therein 0.5% citric acid. Each portion is thoroughly blended and shaped into bricks in a brick press, under forming pressures of about 8,000 to 10,000 lbs. per sq. in. The bricks so obtained exhibit the characteristics or properties set forth in Table V.

TABLE V

| Property | Bricks | |
|---|---|---|
| | 4a | 4b |
| Bulk Density, lbs./cu. ft.: | | |
| Unfired, chemically bonded | 172 | 176 |
| After firing at 1,400° C | 171 | 174 |
| Apparent porosity, after firing at 1,400° C. (percent) | 21 | 18.7 |
| Cold crushing strength in lbs./sq. in.: | | |
| (1) Unfired, dried | 20,500 | 23,700 |
| (2) Intermediate, after firing to 900° C | 4,400 | 7,500 |
| (3) Burned, after firing at 1,400° C | 9,750 | 16,500 |

It is to be understood that other grains or aggregate can be employed in refractory batches or concrete made according to this invention. For example, the nonacid aggregate can consist essentially entirely of chromite ore, or of alumina, spinel or other grain. Also, as shown herein above, there can be employed as another form of the magnesia material of the cementitious composition magnesia spinels having sufficient free MgO, over the spinel combination, to act as magnesia cementing or bonding component. Liquids other than water can be employed as tempering agent, if desired. For example, trimagnesium citrate, which is only slightly soluble in water, is soluble in alcohol, and the latter liquid can be employed in using this salt. The magnesia and the acid or salt or ester described above can be mixed dry for storing or shipping. The ester useful herein can be, for example, the methyl, ethyl or butyl ester, for instance, methyl citrate.

If desired, other bonding agents can also be employed in refractories made according to this invention. The examples above show the use of a minor amount of finely divided silica, or of magnesium sulfate, or both, for instance. There can also be employed, for example, magnesium chloride, chromium compound bonds such as those shown in Austin and Hicks, U.S. 2,537,013, boric acid, or sodium silicate. If desired, other agents which are effective in increasing resistance to dimensional change in magnesian refractories, e.g., such as are shown in Austin et al., U.S. 2,702,751, dated Feb. 22, 1955, can also be incorporated in the cementitious compositions or products of this invention. Especially good results have been obtained in making refractory batches or concrete employing nonacid aggregate and 10% to 60% of a cementitious agent according to this invention, containing from about ⅛% to 1%, calculated as $Cr_2O_3$, of a chromium compound and a small amount, up to 2%, of citric acid, the amounts of chromium compound and citric acid being based on the total weight of the refractory. In another variation, the addition agent of this invention, for instance, citric acid or a salt thereof or both, is also advantageously used along with a thermoplastic carbonaceous bonding agent, such as a water emulsion of coal tar; and in such process the citric acid or like agent is admixed with a small amount of water and first mixed with the grain or aggregate to wet the latter, after which the carbonaceous bonding agent is incorporated in the batch.

In this specification and claims parts and percentages are given by weight unless otherwise specified. Screen sizes given herein are those of Tyler screens as defined on page 1719 of Chemical Engineers' Handbook, John H. Perry, 2nd edition, 1941, published by McGraw-Hill Book Co. The term "castable" or "cast" in this application is intended to refer and to describe a composition which will flow or can be shaped to a desired form or to the form of a container or support under its own weight, or by vibration, or under only moderate pressures of the order of 100 pounds or less per square inch, and which subsequently hardens to form a strong shape or structure; and is to be distinguished from fused or molten casting of materials which have been heated to high temperatures to enable casting of a melted material. The term "volatilized silica" employed herein means silica which has been recovered from the fumes evolved from furnaces wherein ferrosilicon is being produced by reaction of iron, carbon and siliceous material, and it is of very small particle size. The Blaine test is A.S.T.M. Standard Method C204–55. The bulk densities, or unit weights, of the finely divided magnesias shown herein are determined upon samples of the material passing 200 mesh and compacted under its own weight by tapping the container in which it is placed; and those of the brick by A.S.T.M. Standard Method C 134–41. The term "salt" of the organic acid of this invention is intended to include the organic salt or ester.

In conformity with common practice in reporting chemical analyses of refractory materials, in the specification and claims the proportions or amounts of the various chemical constituents present in a material are given as though these constituents were present as the simple oxides, whereas in actuality they may be present in one or more chemical combinations with each other. For example, the magnesium constituent is reported or expressed as MgO, magnesium oxide, the silicon constituents as silica, $SiO_2$, although at least a portion of these constituents may actually be present as magnesium silicate.

Having now described the invention, what is claimed is:

1. A cementitious refractory material consisting essentially of an intimate admixture of finely divided nonplastic magnesia and from 0.1% to 15% of at least one substance chosen from the group consisting of an aliphatic hydroxy tricarboxylic acid and a salt of said acid.

2. Composition as in claim 1 wherein said finely divided magnesia contains not over 2% of CaO.

3. Composition as in claim 1 wherein said cementitious material contains not over 2% silica.

4. A composition as in claim 1 containing from 0.1% to 15% citric acid.

5. Composition as in claim 1 containing from 0.1% to 6% citric acid.

6. Composition as in claim 1 containing from 0.1% to 15% of an alkali metal salt of citric acid.

7. Composition as in claim 1 containing from 0.1% to 15% of an alkaline earth metal salt of citric acid.

8. Composition as in claim 1 containing from 0.1% to 15% of ammonium salt of citric acid.

9. Composition as in claim 1 containing from 0.1% to 15% of a magnesium salt of citric acid.

10. Dry refractory composition which consists essentially of a refractory aggregate and from 10% to 60% of a cementitious refractory material consisting essentially of an intimate admixture of finely divided non-plastic magnesia and from 0.1% to 15% based on the weight of said cementitious material, of at least one substance chosen from the group consisting of an aliphatic hydroxy tricarboxylic acid and a salt of said acid.

11. Composition as in claim 10 wherein said refractory aggregate is periclase.

12. Composition as in claim 10 wherein said refractory aggregate consists essentially of an acid aggregate.

13. Composition as in claim 10 wherein said substance is citric acid.

14. Composition as in claim 10 wherein said substance is magnesium citrate.

15. Composition as in claim 10 wherein said substantce is an alkali metal salt of citric acid.

16. Composition as in claim 10 wherein said substance is an alkaline earth metal salt of citric acid.

17. Composition as in claim 10 wherein said substance is an ammonium salt of citric acid.

18. Shaped refractory product comprising refractory aggregate and from about 10% to 60% based on total dry weight of a bonding material which consists essentially of an intimate admixture of finely divided nonplastic magnesia and from 0.1% to 15% of the weight of said bonding composition of at least one substance chosen from the group consisting of an aliphatic hydroxy tricarboxylic acid and a salt of said acid.

19. Product as in claim 18 wherein said substance is citric acid.

20. Process for making a cold cast refractory product which comprises admixing refractory grain material, from 10% to 60% of a cementitious product consisting essentially of finely divided nonplastic magnesia and an amount up to 15% calculated on the weight of said cementitious composition, sufficient to provide a refractory product resistant to dimensional change and of high bulk density, of at least one substance chosen from the group consisting of an aliphatic hydroxy tricarboxylic acid and a salt of said acid, and a tempering amount of liquid, casting said admixture, hardening and drying.

21. Process as in claim 20 wherein said liquid is water.

22. Process as in claim 20 wherein said substance is citric acid.

23. Process for making a shaped refractory product which comprises admixing refractory grain material, from 10% to 60% of a cementitious composition consisting essentially of finely divided nonplastic magnesia and an amount up to 15%, based on the weight of said cementitious composition, sufficient to provide a refractory product resistant to dimensional change and of high bulk density, of at least one substance chosen from the group consisting of an aliphatic hydroxy tricarboxylic acid and a salt of said acid, tempering said admixture with liquid, pressing into shapes, hardening and drying.

24. Process as in claim 23 wherein said liquid is water.

25. Process as in claim 23 wherein said substance is citric acid.

26. A dry refractory composition comprising a nonacid refractory aggregate and from 10% to 60% of a bonding composition which consists essentially of an intimate admixture of finely divided magnesia and from 0.1% to 6% citric acid.

27. A refractory composition consisting essentially of deadburned magnesite and between about 0.25% to about 2.0% of citric acid.

References Cited

UNITED STATES PATENTS 1,853,521    4/1932    Steward _____ 106—106

TOBIAS E. LEVOW, *Primary Examiner.*

JOHN H. MACK, *Examiner.*

J. E. POER, *Assistant Examiner.*